ated Apr. 22, 1969

United States Patent Office 3,440,178
Patented Apr. 22, 1969

3,440,178
REACTIVATION OF CATALYSTS
Paul Anthony Lawrance, Stanwell, and Bernard Whiting Burbidge, Leatherhead, England, assignors to The British Petroleum Company Limited, London, England, a corporation of England
No Drawing. Continuation of application Ser. No. 423,573, Jan. 5, 1965. This application Jan. 24, 1967, Ser. No. 617,001
Claims priority, application Great Britain, Jan. 9, 1964, 1,029/64
Int. Cl. B01j 11/66, 11/80
U.S. Cl. 252—415               12 Claims

ABSTRACT OF THE DISCLOSURE

The invention relates to catalysts prepared by chlorinating an inorganic oxide such as alumina with a compound of general formula

(where X and Y may be H, Cl, Br, F or SCl, or may together be O or S) and used for low temperature conversion processes are reactivated by heating in an oxygen free gas to above 400° F. and then rechlorinated.

An oxidative burn-off to remove the remaining deposits is given after the treatment with the oxygen free gas, which is preferably hydrogen.

The process is particularly suitable for reactivating catalysts used for the isomerisation of pentanes and hexanes at temperatures below 400° F.

---

This application is a continuation of application Ser. No. 423,573, filed Jan. 5, 1965.

This invention relates to the reactivation of catalysts, particularly catalysts used for the isomerisation of $C_4$ or higher paraffin hydrocarbons boiling within the gasoline boiling range, i.e. up to 400° F. (204° C.), at temperatures below 400° F. (204° C.).

The complete specification of U.K. Patent No. 953,187 (and co-pending U.S. application Ser. No. 135,426, filed Sept. 1, 1961) claims a catalyst suitable for use in an isomerisation process as defined above which is prepared by contacting alumina with a compound of general formula.

(where X and Y may be the same or different and selected from H, Cl, Br, F, or SCl, or where X and Y together may be O or S) under non-reducing conditions and at a temperature such that chlorine is taken up by the alumina without the production of free aluminium chloride. The use of such a catalyst in an isomerisation process as defined above is claimed in the complete specification of U.K. Patent 953,189 (and U.S. patent application Ser. No. 135,426, filed Sept. 1, 1961, and U.S. patent application Ser. No. 135,425, now abandoned, filed Sept. 1, 1961). As with other catalysts, the catalyst loses activity during processing and particular materials which have been found to cause deactivation if present in excess are aromatic hydrocarbons, olefin hydrocarbons, water and sulphur. Deactivation may also result from the deposition of carbonaceous or hydrocarbonaceous material. In U.K. Patent No. 969,863 (and U.S. patent application Ser. No. 224,531, filed Sept. 18, 1962) a method of catalyst regeneration is disclosed involving the oxidative burning off of impurities and re-chlorination.

In the course of further experiments it has been found that a large proportion of the deactivating impurities can be removed by means other than an oxidative burn-off. In some circumstances, explained in more detail below, the burn-off may be dispensed with altogether. In other circumstances, also explained below, an oxidative burn-off may be desirable to remove the final amounts of deactivating impurities. However in both circumstances chlorine is likely to be lost from the catalyst and this chlorine has to be replaced if full restoration of catalyst activity is to be achieved.

According to the present invention therefor, a process for the reactivation of a catalyst which has been prepared by reacting a halogenatable inorganic oxide with a compound of general formula,

(where X and Y may be the same or different and selected from H, Cl, Br or SCl, or where X and Y together may be O or S) under non-reducing conditions and at a temperature of from 300 to 1100° F. such that chlorine is taken up by the oxide without the production of free chloride and which has become deactivated during a low-temperature conversion process operating at a temperature below 400° F., particularly a low temperature isomerisation process as hereinbefore defined, comprises heating the catalyst in contact with an oxygen-free gas to a temperature above 400° F. to remove deactivating impurities and thereafter contacting the catalyst with a compound and under the conditions given above.

The oxygen-free gas may be an inert gas, for example nitrogen, or methane, or, preferably, hydrogen. The particular benefit obtained by the use of hydrogen is that, at the temperatures used, particularly if the catalyst contains a hydrogenating component such as a platinum group metal, the impurities may be destructively hydrogenated and their removal facilitated in this way. The gas should be free of the compounds mentioned above which are known to cause catalyst deactivation and also, particularly where the catalyst contains a hydrogenating component such as a platinum group metal, free of compounds which could themselves undergo conversion or which could cause migration or loss of the hydrogenating component. The temperature is preferably raised gradually or in stages, for example at a rate of 25–125° F. (14–51° C.) hour, to a temperature within the range 500 to 1000° F. (260–538° C.), particularly 600° to 900° F. (316–482° C.). In this way impurities which are easily removed are removed first at low temperatures and the catalyst is not unnecessarily held at high temperatures for too long. The duration of the total treatment will depend on the extent of deactivation and on the temperature used but it may conveniently lie within the range 2 to 100 hours, particularly 10 to 50 hours, 2 to 25 hours being desirably the time for which the catalyst is held at the highest temperature used (e.g. 800–900° F.). The pressure may be sub-atmospheric, atmospheric or super atmospheric. The preferred pressure is thus from atmospheric to the operating pressure of the conversion process, more particularly 0 to 750 p.s.i.g. The gas used may be recycled in which case the gas should be treated to remove acidic components such as chlorine by a caustic soda wash. Both the fresh and recycled gas should also be dry.

After the treatment with an oxygen-free gas to remove deposits and impurities the catalyst may be purged with an inert gas, this being particularly desirable when the treating gas is hydrogen.

The removal of impurities by inert gas or hydrogen alone may be adequate when the catalyst requires re-activation after only a short time on stream for example up to 500 hours on stream. This may sometimes happen as, for example, when the plant has to be shut down for other reasons and time will be saved by reactivating during the shut-down.

However, when the catalyst has run its full expected hours on stream, which in the case of a catalyst used for the preferred low temperature isomerisation process if likely to be at least 1000 hours on stream, an oxidative burn-off to remove the residual impurities may be required, after the treatment with an oxygen-free gas.

In the oxidative burn-off the temperature should be in the 500–1000° F. (260–538° C.) range, preferably 700–850° F. (371–454° C.) the temperature being controlled by control of the amount of oxygen fed in. An oxygen-inert gas mixture is preferably used in which the oxygen content may conveniently be in the range 0.1 to 5% vol. The gases used are desirably recycled in which case the gas should be treated to remove acidic components such as chlorine e.g. by a caustic soda wash. Both the fresh and recycled gas should also be dry. The pressure used may be the same as for the hydrogen treatment.

The duration of the oxidative burn-off should be sufficent to remove residual impurities and may be from 1 to 20 hours.

After the oxidative burn-off the catalyst bed may be purged again with an inert gas.

The catalyst is finally chlorinated to replace chlorine lost during the previous conversion process or during the previous treatment. It has been found that not all the chlorine is lost and hence the extent of the re-chlorination is usually less than that of the initial chlorination. The amount of chlorine lost can be determined, if desired, by sampling of the catalyst after the previous treatment, by a comparative small-scale experiment, or by analysis of the gases from the previous treatment. However, this is usually unnecessary since the course of the rechlorination may be followed by the exothermic temperature changes occurring, and the reaction controlled to ensure that overchlorination does not occur. In practice it has been found that approximately half the chlorine is lost during the previous treatment.

The types of catalyst suitable for the present reactivation process and the method of chlorination are described in the complete specifications of the U.K. patents referred to in the second paragraph of the present specification, but they will, for convenience, be set out again below.

The inorganic oxide besides being halogenatable under the conditions specified above should also clearly have the desired physical characteristics to render it suitable as a hydrocarbon conversion catalyst. It is preferably a refractory oxide selected from Groups II to V of the Periodic Table, for example alumina, boria, silica, titania, or zirconia. Mixtures of two or more inorganic oxides may be used if desired, one of them being, preferably, alumina. The preferred refractory oxide is alumina and the preparation will, for convenience, be subsequently described with reference to this preferred oxide.

A particular feature of the catalyst preparation is the use of the specific compounds of the general formula indicated, these compounds giving a specific form of chlorination which produces active low temperature isomerisation catalysts. The following examples of compounds giving active and inactive catalysts respectively illustrate the specific nature of the compounds used.

Compounds giving active catalysts:
  Carbon tetrachloride ($CCl_4$)
  Chloroform ($CHCl_3$)
  Methylene chloride ($CH_2Cl_2$)
  Trichlorobromomethane ($CCl_3Br$)
  Thiocarbonyltetrachloride ($CCl_2SCl$)

Compounds giving inactive catalysts:
  Hydrogen chloride (HCl)
  Chlorine ($Cl_2$)
  Methyl chloride ($CH_3Cl$)
  Acetyl chloride ($CH_2COCl$)
  Dichloroethane ($CH_2Cl$—$CH_2Cl$)
  Tetrachloroethane ($CHCl_2$—$CHCl_2$)
  Tetrachloroethylene ($CCl_2$=$CCl_2$)

In the case of compounds containing elements other than chlorine carbon and hydrogen, the treatment may add the other elements to the catalyst in addition to the chlorine. It has been found, however, that catalysts so prepared are still active for low temperature isomerisation, and they may have, in addition other properties resulting from the addition of the other elements. It has also been found that small amounts of halogens (including chlorine) which may be present in the alumina prior to the chlorination treatment of the present invention do not affect the activity of the catalysts for low temperature isomerisation activity. Thus, the alumina used may already contain up to 1% wt. of chlorine and/or fluorine, as when for example, the material which is chlorinated by the process of the present invention is a catalyst normally used for the reforming of gasoline boiling range hydrocarbons. The preferred compounds giving active catalysts are carbon tetrachloride, chloroform and ethylene chloride.

The compounds covered by the general formula in which X and Y together are O and S are phosgene and thiophosgene.

Any convenient form of alumina may be used which contains hydrogen. This is a characteristic of activated aluminas which, although predominantly alumina, do contain a small amount of hydrogen, usually less than 1% wt. This hydrogen is generally considered to be in the form of active surface groups, for example hydroxyl groups, and it is believed that these active groups react with the chlorine compound with loss of an oxygen atom. The amount of chlorine added to the catalyst is preferably within the range 1 to 15% wt., the precise amount being dependent on the surface area as measured by low temperature nitrogen absorption. It has been found that the maximum amount of chlorine which can be added without the formation of free aluminium chloride is related to the surface area and is about $3.0$–$3.5 \times 10^{-4}$ g./m.$^2$ of surface area of the inorganic oxide. Maximum chlorination is preferred, but lower amounts of chlorine still give active catalysts and a suitable range is, therefore, from $2.0 \times 10^{-4}$ g./m.$^2$ to $3.5 \times 10^{-4}$ g./m.$^2$.

Any of the forms of alumina suitable as a base for reforming catalysts may be used, but a particularly preferred form is one derived from an alumina hydrate precursor in which the trihydrate predominates. One containing a major proportion or β-alumina trihydrate is particularly suitable. A convenient method of preparing the alumina is by hydrolysis of an aluminium alcoholate, for example aluminium isopropoxide, in an inert hydrocarbon solvent, for example, benzene. Other things being equal, the greater the amount of chlorine taken up by the alumina, the greater is the activity of the catalyst and since, as stated above, the maximum amount of chlorine which can be added is related to the surface area, it is desirable that the alumina should have a high surface area, for example more than 250 m.$^2$/g. and preferably more than 300 m.$^2$/g.

Preferably the alumina contains a minor proportion, for example less than 25% wt. of total catalyst, of a metal or metal compound having hydrogenating activity selected from Groups VIa and VIII of the Periodic Table. The preferred metal is a platinum group metal which may be present in an amount from 0.01 to 5% wt. and preferably 0.1 to 2% wt. The preferred platinum group metals are platinum and palladium.

The hydrogenating metal is desirably incorporated with the alumina prior to the treatment with the chlorine. When using a platinum group metal it is also desirable that it should be finely dispersed as small crystallites on the alumina, suitable criteria for the size of the crystallites being that they are not detectable by X-ray diffraction.

A convenient method of obtaining the platinum group metal in the required state of sub-division is to add a solution of a platinum group metal compound to a hydrogel of the alumina and to precipitate the platinum group metal as a sulphide, for example by treatment with hydrogen sulphide. The treatment of the platinum group metal-alumina composite with the chlorine compound is preferably given with the platinum group metal in a reduced state. When a platinum group metal-alumina composite is treated with a chlorine compound it is believed that a portion of the chlorine taken up is associated with the platinum group metal as an active complex.

In some cases, the presence of active complexes in the catalysts can be demonstrated by the development of intense colours (orange-yellow) on treatment with dry benzene.

An alumina only (after carbon-tetrachloride treatment) gives a yellow colour with benzene but this does not persist on flushing with dry nitrogen.

The platinum-on-alumina (after treatment with carbon tetrachloride) however gives a stable yellow colour with benzene and can be stored under dry nitrogen indefinitely.

The non-reducing conditions used for the chlorination may be either inert or oxidising conditions. A convenient method of contacting the alumina is to pass a gaseous stream of the chlorine compound over the alumina either alone or, preferably, in a nonreducing carrier gas. Examples of suitable carrier gases are nitrogen, air or oxygen.

Non-reducing conditions are essential, since reducing conditions tend to convert the chlorine compound to hydrogen chloride, which gives an inactive catalyst. The temperature for the chlorination is, as stated earlier, from 300–1100° F. (140–593° C.). The tendency to form free aluminium chloride increases with temperature and care should, therefore, be exercised when using the higher temperatures within the stated range. Since the temperatures used will normally be above the volatilisation temperature of aluminium chloride the formation of free aluminium chloride is readily detected by its appearance in the gaseous reaction products. When treating a platinum group metal-alumina composite, care should also be exercised to prevent the formation of volatile platinum complexes, the tendency for the formation of such complexes again increasing with increasing temperature. When treating platinum group metal-alumina composites the temperature is preferably 300–700° F. (149–371° C.), more particularly 350 to 550° F. (177–288° C.). The chlorination reaction is exothermic and the temperatures specified are the initial temperatures used.

The rate of addition of the chlorine compound is preferably as low as practicable to ensure uniform chlorination and to avoid a rapid increase of temperature as a result of the exothermic reaction. Preferably the addition rate does not exceed 1.3% of chlorine compound by weight of catalyst per minute. If a carrier gas is used the rate of flow is preferably at least 200 volumes/volume of catalyst/hour and a convenient range is 200–1000 v./v./hr. The pressure used is conveniently from atmospheric to 250 p.s.i.g.

The active catalyst is susceptible to hydrolysis in the presence of water and should, therefore, be stored under anhydrous conditions. Similarly the materials used in the catalyst preparation should also be free from water.

The catalyst has activity for a number of hydrogen conversion reactions and the reactivation technique may be used in any process where deactivation occurs. It is, however, particularly suitable for use in the isomerisation process claimed in the complete specification of U.K. Patent No. 953,189. The process claimed comprises contacting $C_4$ or higher paraffin hydrocarbons boiling in the gasoline boiling range, i.e. up to 400° F. (204° C.) in the presence of hydrogen at a temperature below 400° F. (204° C.) with a catalyst prepared as described above. The term isomerisation includes both the conversion of normal paraffins to iso-paraffins and the conversion of iso-paraffins to iso-paraffins with a higher degree of branching.

The feedstock to this isomerisation process is preferably one containing a major proportion of pentanes, hexanes or a mixture of these paraffins. If it is desired to isomerise normal paraffins only, the feedstock may first be treated to separate normal paraffins from the other hydrocarbons and the normal paraffins contacted with the isomerisation catalyst.

The product of the isomerisation reaction may similarly be treated to recover unconverted normal paraffins which may be recycled to the isomerisation reaction zone.

The isomerisation is preferably carried out under the following conditions, in either liquid or vapour phase.

| | |
|---|---|
| Temperature | 50–400° F. particularly 150–350° F. |
| Pressure | 100–2000 p.s.i.g. particularly 225–1000. |
| Feedstock liquid hourly space velocity | 0.05–10 v./v./hr. particularly 0.2–5. |
| Hydrogen:hydrocarbon mole ratio | 0.01–20:1, particularly 1.5–15:1. |

This deactivating effect of impurities, particularly aromatics and olefins, appears to be cumulative and, therefore, quite small amounts of impurities by weight of feedstock passed constitute a deactivating amount. For example 0.01% wt. or more of aromatics or olefins by weight of feedstock, and particularly 0.1% wt. or more may have an adverse effect. Thus, although the present invention provides a method of restoring loss of activity it is nevertheless desirable to maintain the quantity of impurities at a low level, by pretreatment of the feedstocks as necessary. Preferably the aromatic and olefin contents are each not more than 0.5% wt. It is also very desirable to maintain a low level of sulphur and water in the reaction zone, for example less than 5 parts per million of each.

The invention is illustrated by the following examples.

EXAMPLE 1

This example shows the restoration of activity of a deactivated catalyst by treatment with hydrogen followed by rechlorination.

A catalyst was prepared by reacting carbon tetrachloride with a commercial 0.58% wt. platinum or alumina reforming catalyst under the following conditions:

| | |
|---|---|
| Catalyst temperature (initial) ° F | 550 |
| Air carrier gas rate v./v./hr | 500 |
| CCl$_4$ addition rate percent vol. on air | 0.7 |
| Total CCl$_4$ added percent wt. on catalyst | 30 |

The catalyst had the following composition:

| | |
|---|---|
| Chlorine percent wt | 13.9 |
| Carbon do | 0.04 |
| Surface area m.²/g | 336 |
| Pore volume ml./g | 0.29 |

The catalyst was used to isomerize a desulphurized dearomatized hexane fraction from a light gasoline under the following conditions:

| | |
|---|---|
| Temperature ° F | 270 |
| Pressure p.s.i.g | 250 |
| Liquid hourly space velocity v./v./hr | 1.0 |
| Hydrogen:hydrocarbon mol ratio | 2.5:1 |

Anhydrous hydrogen chloride was added to maintain a concentration of 5 percent mol HCl in the recycle gas. After 160 HOS the run was terminated (i.e. before full deactivation) and the catalyst taken from the top of the bed was found to have taken up a significant quantity of carbon and hydrogen as follows:

| | |
|---|---|
| Chlorine | percent wt__ 13.15 |
| Carbon | do____ 3.73 |
| Hydrogen | do____ 0.94 |
| Surface area | m.²/g__ 257 |

Samples of the fresh and used catalyst were then examined for isomerization activity using a desulphurized pentane feedstock under the following conditions:

| | |
|---|---|
| Temperature | ° F__ 270 |
| Pressure | p.s.i.g__ 250 |
| Liquid hourly space velocity | v./v./hr__ 2.0 |
| Hydrogen:hydrocarbon mol ratio | 2.5:1 |

After processing for 30 HOS the following analyses of feed and products were obtained.

| Composition by GLC | Feed | Fresh catalyst | Used catalyst |
|---|---|---|---|
| $C_5$ paraffin fraction: | | | |
| n-Pentane | 92 | 25 | 50 |
| i-Pentane | 8 | 75 | 50 |

The used catalyst thus had a lower isomerization activity than the fresh catalyst.

Another sample of the used catalyst was treated with a stream of hydrogen flowing at 200 v./v./hr. The temperature was 700° F. and the duration of treatment 53 hours. After treatment the catalyst zone was purged free of hydrogen with dry nitrogen and after cooling to ambient temperature a small sample was taken for analysis. The analysis showed the following composition:

| | |
|---|---|
| Chlorine | percent wt__ 7.8 |
| Carbon | do____ 0.04 |
| Hydrogen | do____ 0.10 |
| Surface area | m.²/g__ 350 |
| Pore volume | ml./g__ 0.33 |

The analysis thus shows almost complete removal of carbon and hydrogen, and a loss of about half the chlorine.

The hydrogen treated catalyst was then rechlorinated to a chlorine content of 13 percent weight using the same technique as in the original catalyst preparation but with a proportionately lower amount of total chlorine passed. The rechlorinated catalyst was retested for isomerization activity with pentane feedstock. Complete restoration of activity was achieved as indicated by a product isopentane content of 74 percent weight at 30 HOS.

EXAMPLE 2

A portion of the deactivated catalyst of Example 1 was treated with a stream of nitrogen flowing at 200 vol./vol./hour.

The duration of the treatment was 53 hours and the temperature used covered the range 500 to 920° F. The temperature was raised stepwise by increasing the temperature by 50° F. during a period of 1 hour, holding the temperature steady for 3 hours, then raising it a further 50° F. in 1 hour and so on. Analyses of the catalyst before and after this treatment were:

| | Before | After |
|---|---|---|
| Platinum, percent wt | 0.388 | 0.466 |
| Chlorine, percent wt | 13.15 | 7.0 |
| Carbon, percent wt | 3.73 | 0.75 |
| Hydrogen, percent wt | 0.94 | 0.10 |

The treatment thus showed substantial removal of carbon and hydrogen, and again, removal of about half the chlorine.

EXAMPLE 3

This example shows the reactivation of a deactivated catalyst by hydrogen treatment, oxidative burn-off and rechlorination.

A catalyst having the following initial composition:

| | Percent by weight |
|---|---|
| Platinum | 0.53 |
| Chlorine | 13.0 |
| Alumina | Balance | was used for 974 hours in a low temperature isomerisation process operating under the following conditions:

| | |
|---|---|
| Feedstock | $C_5/C_6$ gasoline fraction. |
| Temperature | 230–270° F. |
| Pressure | 250 p.s.i.g. |
| Space velocity | 1–2 v./v./hr. |
| Hydrogen:hydrocarbon mole ratio | 2.2:1. |

After the 974 hours the catalyst activity had declined to 69% wt. of iso-pentane produced from an initial activity of 78% wt. isopentane produced. The catalyst was then reactivated in three stages as follows:

Stage 1—Hydrogen treatment

| | |
|---|---|
| Pressure, p.s.i.g. | 100. |
| Temperature, ° F. | Ambient—800 (rising at 50° F./h.). |
| Recycle flow rate, vol./vol./h. | 33.75 (calc. at 100 p.s.i.g.). |
| Duration at 800° F., hours | 10. |

The recycle gas was passed through Sofnolite to remove acidic components and dried with a molecular sieve. Analyses of the recycle gas (after scrubbing and drying) are given below.

| Time, hr | 0 | 2 | 4 | 8 | 10 | 12 | 16 | 26½ | 31½ |
|---|---|---|---|---|---|---|---|---|---|
| Catalyst, temperature, ° F | Ambient | 100–200 | 150–300 | 400 | 450–500 | 550–600 | 700 | 800 | 800 |
| Analysis: | | | | | | | | | |
| $H_2$, percent mol | 100 | 99.9 | 99.8 | 99.0 | 99.3 | 99.6 | 99.4 | 98.8 | 98.8 |
| $CH_4$, percent mol | | | | | | 0.3 | 0.6 | 1.1 | 1.2 |
| $C_2H_6$, percent mol | | Tr | Tr | Tr | | Tr | Tr | 0.1 | Tr |
| $C_3H_8$, percent mol | | Tr | Tr | | | | | | |
| $iC_4H_{10}$, percent mol | Tr | Tr | 0.1 | 0.6 | 0.3 | Tr | | | |
| $nC_4H_{10}$, percent mol | | Tr | Tr | | | | | | |
| $iC_5H_{12}$, percent mol | Tr | 0.1 | 0.1 | 0.2 | 0.2 | Tr | | | |
| $C_6H_{14}$, percent mol | | Tr | Tr | 0.2 | 0.2 | 0.1 | | | |

These analyses show that $C_4$–$C_6$ hydrocarbons are desorbed from the catalyst during the early period. These are presumably then laid down in a cold part of the system—probably by adsorption on the Sofnolite or molecular sieve. The build-up of methane at the higher temperatures (600°–800° F.) presumably arises from the destructive hydrogenation of "coke" on the used catalyst.

Stage 2—Oxidative treatment

On completion of Stage 1, the system was vented, purged and filled with nitrogen. The catalyst temperature was lined out at 700° F. for the oxidative step which removed residual "coke" under the following conditions:

| | |
|---|---|
| Pressure | p.s.i.g__ 100 |
| Temperature (850 max.) | ° F__ 700 |

Recycle flow rate (calc. at 100
 p.s.i.g.) _____vol./vol./h__ 33.75
Duration _____hours__ 5½

Air was admitted to give 1% vol. oxygen at the reactor inlet and the reactor effluent was passed through a Sofnolite/molecular sieve scrubber/drier. After 1 hour the air rate was cut back as the temperature at the top of the bed approached 850° F. After a further 2½ hours the air rate was raised to give 1% $O_2$ at the reactor inlet again and a small exotherm (ca. 6° F.) was observed at the bottom of the catalyst bed. After a further hour the reactor effluent contained 2% vol. oxygen and this rose to 5.6% vol. during the following hour and the oxidative treatment was then terminated. Little burning was observed in the bottom ¾ of the catalyst bed.

Stage 3—Rechlorination

After the oxidative treatment the unit was vented, purged, refilled with fresh nitrogen and lined out at 450° F. for the rechlorination step which was carried out under the conditions described in Example 1.

The reactivated catalyst when tested for isomerisation activity, again as described in Example 1, showed full restoration of activity.

EXAMPLE 4

This example shows a process with several cycles of isomerisation followed by catalyst reactivation.

The catalyst used was prepared in a manner similar to that described in Example 1 and had the following composition.

Percent by weight
Palladium _____ 0.48
Chlorine _____ 11.4
Alumina _____ Balance Throughout the run, the following processing conditions were used:

Temperature _____° F__ 270
Pressure _____p.s.i.g__ 250
Space velocity _____v./v./hr__ 2
Hydrogen:hydrocarbon mole ratio _____ 2.5:1
Carbon tetrachloride addition to feed stock
                                       percent wt__ 1

The feedstocks used, the results obtained and the regeneration conditions in each cycle were as follows:

First cycle (103 hours on stream)

Feedstock _____ $C_5$ fraction (92% wt. n-pentane).
Product _____ 76% wt. iso-pentane.

To regenerate the catalyst a 1000 v./v./hr. flow of hydrogen was established. The temperature was raised from 80° F. to 800° F. at a rate of 100° F./hr. and then held at 800° F. for 12 hours. The catalyst was cooled to 500° F. in the hydrogen flow, and then purged with nitrogen. Air at 200 v./v./hr. was introduced at this temperature of 500° F.; the temperature rose and was held at 850° F. for 2 hours and then lowered again to 500° F., when the air flow was stopped and the catalyst purged with nitrogen. Rechlorination was carried out at 500° F. using a nitrogen stream saturated with carbon tetrachloride at 0° C. and flowing at 1500 v./v./hr. The total weight of carbon tetrachloride passed was 50% wt. on catalyst.

Second cycle (420 hours on stream)

From 0 to 280 hours on stream the feedstock and product was the same as the first cycle.

From 280 to 350 hours on stream the feedstock was a $C_5/C_6$ gasoline fraction. The conversion at 280 hours on stream to isopentane was 70% wt. and to 2,2-dimethylbutane was 30% wt. By 350 hours on stream the conversions had dropped to 40% wt. and 8% wt. respectively and the feedstock was then changed to a $C_5$ fraction. A 40% wt. conversion at 350 hours on stream declined to 8% wt. by 420 hours on stream.

The reaction was then terminated and the catalyst reactivated using the same procedure as at the end of the first cycle.

Third cycle (470 hours on stream)

The feedstock for hours 0–40 was a $C_5$ fraction and the product was 74% wt. isopentane.

From 40 to 470 hours the feedstock was a $C_5/C_6$ fraction and the product contained:

65% wt. isopentane at 40 hours declining to 58% wt. at 470 hours.

29% wt. 2,2-dimethylbutane at 40 hours declining to 20% wt. at 470 hours.

The catalyst was then reactivated again using the same procedure as at the end of the first cycle.

Fourth cycle (250 hours on stream)

The feedstock was again a $C_5/C_6$ fraction and the following product yields were obtained:

|  | Beginning | End |
|---|---|---|
| Isopentane, percent wt | 68 | 52 |
| 2,2-dimethylbutane, percent wt | 30 | 15 |

Reactivation at the end of the fourth cycle was as before.

Three further cycles of processing and reactivation were carried out. At the end of the seventh cycle the catalyst was analyzed. The chlorine content at 5.1% wt. was low but the palladium content was unchanged and the catalyst was still in good physical condition.

This example thus shows that repeated reactivations are possible with good restoration of catalyst activity and without damage to the catalyst.

What is claimed is:

1. A process for the reactivation of a catalyst which has been prepared by reacting a refractory halogenatable inorganic oxide selected from the group consisting of boria, alumina, silica, titania and zirconia with a compound of general formula

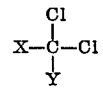

where X, when a monovalent radical, is selected from the group consisting of H, Cl, Br, F and SCl, where Y, when a monovalent radical, is also selected from the group consisting of H, Cl, Br, F and SCl, and where X and Y, when they together form a divalent radical, is selected from the class consisting of O and S under non-reducing conditions and at a temperature of from 300 to 1100° F. such that from $2.0 \times 10^{-4}$ to $3.5 \times 10^{-4}$ g. of chlorine/sq. metre of surface area are taken up by the oxide without the production of free chloride and which has become deactivated during a low temperature conversion process operating at a temperature below 400° F., comprising heating the catalyst in contact with an oxygen-free gas selected from the group consisting of hydrogen, nitrogen and methane gas to a temperature in the range of 600–900° F. for a period of from 2 to 100 hours to remove deactivating impurities, treating the resulting catalyst with an oxygen-containing gas at a temperature of 500 to 1000° F. to burn off residual impurities and thereafter contacting the catalyst with a chlorine containing compound as defined above under the conditions defined above to restore the chlorine content to the said range of from $2.0 \times 10^{-4}$ to $3.5 \times 10^{-4}$ g. of chlorine/sq. metre of surface area.

2. A process as claimed in claim 1 wherein the catalyst contains from 0.01 to 5% wt. of a platinum group metal.

3. A process as claimed in claim 1 wherein the oxygen-free gas is hydrogen.

4. A process as claimed in claim 1, wherein the duration of the treatment with the oxygen free gas is 10 to 50 hours.

5. A process as claimed in claim 1 wherein the temperature used during the treatment with the oxygen free gas is raised at a rate of 25–125° F./hour and then held for 2 to 25 hours at 800 to 900° F.

6. A process as claimed in claim 1 wherein the pressure used during the treatment with an oxygen free gas is from 0 to 750 p.s.i.g.

7. A process as claimed in claim 1 wherein the temperature of the treatment with an oxygen-containing gas is 700 to 850° F.

8. A process as claimed in claim 1, wherein the duration of the treatment with an oxygen containing gas is 1 to 20 hours.

9. A process as claimed in claim 1, wherein the pressure used during the treatment with an oxygen-containing gas is from 0 to 750 p.s.i.g.

10. A process as claimed in claim 2 wherein the chlorination temperature is from 300 to 700° F.

11. A process as claimed in claim 2 wherein the rate of addition of the chlorine-containing compound does not exceed 1.3% of chlorine compound/weight of catalyst/minute and the compound is in a carrier gas stream flowing at at least 200 volumes/volume of catalyst/hour.

12. A process as claimed in claim 1, wherein the process in which the catalyst has become deactivated is a process for the isomerization of $C_4$ and higher paraffin hydrocarbons boiling within the gasoline boiling range operating at a temperature below 400° F.

References Cited

UNITED STATES PATENTS

| 2,838,446 | 6/1958 | Donaldson | 252—411 |
|---|---|---|---|
| 3,210,265 | 10/1965 | Garwood | 252—411 |
| 3,247,128 | 4/1966 | White et al. | 252—415 |
| 3,280,213 | 10/1966 | Mullen et al. | 252—411 |

DANIEL E. WYMAN, *Primary Examiner.*

C. F. DEES, *Assistant Examiner.*

U.S. Cl. X.R.

252—416